US006550114B1

(12) United States Patent
Reece

(10) Patent No.: US 6,550,114 B1
(45) Date of Patent: Apr. 22, 2003

(54) CREMATION ON ATMOSPHERIC REENTRY

(76) Inventor: John L. Reece, 7123 Eby St., Merriam, KS (US) 66204

( * ) Notice: Subject to any disclaimer, the term of this patent is extended or adjusted under 35 U.S.C. 154(b) by 36 days.

(21) Appl. No.: 09/974,369

(22) Filed: Oct. 10, 2001

(51) Int. Cl.[7] .................................................. A01N 1/00

(52) U.S. Cl. ........................................................ 27/21.1

(58) Field of Search ....................................... 27/21.1, 1

(56) References Cited

PUBLICATIONS

Frequently Asked Questions (pp. 1–6) from www.celestis-.com (at least Mar. 18, 2002, but possibly earlier).*

"Prologue, The Rocket Satellite", pp. 1–3, (at least Mar. 18, 2002 but possibly earlier).*

"Celestial Home Page", www.celestic com, pp. 1–3, (at least Mar. 18, 2002 and possibly earlier).*

The movie called "The Loved One", distributed by MGM/UA Home Video, 1965.*

Aerospace Corporation, The, Spacecraft Reentry Breakup Overview, Feb. 23, 2001, www.aero.org/cords/reentry_overview.html.

Ahrens, Frank, For 24 Loved Ones, Space is Final Frontier, Mar. 12, 1997, www.ohio.com/justgo/trek/coverage/gene/mh_rodden2.html.

Bridges, Andrew, Ashes Travel to Heaven for Space Burial Aboard Rocket, Dec. 21, 1999, www.space.com/missionlaunches/launches/ashes_launched_991221.html.

Celestis, Next Launch, Aug. 31, 2001, www.celestis.com/next–launch.html.

David, Leonard, Oct. 02, 1995, www.space.com/php/spacenews/smembers/sarch/sarch95/sn1002mi.php.

Feldman, Gene Carl, An Overview of SeaWiFS and the SeaStar Spacecraft, Sep. 19, 2001, WWW.seawifs,gsfc.nasa.gov/seawifs/seastar/spacecraft.html.

Goodman, Al, Space final frontier for Timothy Leary, Apr. 20, 1997, www.cnn.com/TECH/9704/20/space.ashes.

Hartlaub, Peter, Now you can go out in style, Oct. 3, 1999, www.creativecremains.com/style.html.

Moses, Tai, Cremation Nation, Apr. 11, 2001, www.metroactive.com/papers/cruz/04.11.01/creamation–0115.html.

* cited by examiner

*Primary Examiner*—Dennis Ruhl

(74) *Attorney, Agent, or Firm*—Chase Law Firm, L.C.

(57) ABSTRACT

This patent discloses a method for cremating human remains by launching the remains into the upper atmosphere or beyond to cause the remains to combust through heat generated during atmospheric reentry.

12 Claims, 8 Drawing Sheets

CREMATION ON ATMOSPHERIC REENTRY

FIELD OF THE INVENTION

The present invention relates generally to human cremation, and more specifically it relates to a method of cremating human remains through heat generated by friction as the remains descend through the Earth's atmosphere.

BACKGROUND OF THE INVENTION

One in five Americans choose cremation for themselves or their loved ones. Although historically uncommon in the United States, cremation is becoming more popular as an alternative to internment. In California, for example, the rate of cremation over burial is approximately 42%. In Nevada, the rate is approximately 57%. Hawaii leads the rest of the country at approximately 59%. Overseas, Japan has the highest cremation rate at over 95%. The overall rate in the United States is expected to increase over the next decade from the low twenties to nearly 38%.

Although the choice to cremate is becoming increasingly popular, relatives of the deceased are often at a loss for how to memorialize the cremated remains. The ashes may often be deposited in a cardboard box or urn that is ultimately stored in a closet or cabinet. In an effort to make storage of the ashes more personal or meaningful, any number of containers have been used such as urns formed from pottery, stone, colored glass, molded plastic, or wood. Ashes have been incorporated into engraved tablets, jewelry, sculptures, and even ink or paint used to create drawings or paintings.

Sometimes the deceased has indicated a preference to have their ashes scattered or spread in a favorite location. The family members of the deceased, however, often feel uncomfortable performing the task. The process can be awkward and can result in ashes blowing back onto the deceased's relatives during the scattering, causing great dismay. Seeing the remains of a loved one become a dusty film on the ground or water can be a disappointing and even traumatic sight for friends and relatives. Even if the cremated remains are merely kept in an urn or other container, eventually they must be disposed of by someone, and the remains may end up in the hands of strangers through estate sales or auctions following the death of those close to the deceased.

Although many human cultures have practiced cremation over the millennia, it has greatly changed in character in recent years. In the past, the cremation process itself was an important aspect of the funeral ceremony. Today, cremation of the body plays no part in a modern funeral, rather, it is performed by strangers at a mortuary or other facility. The sterile efficiency of the modem cremation process is not conducive to providing spiritual meaning for grieving friends and relatives.

The planet Earth is surrounded by a protective layer of gases called the atmosphere. The atmosphere protects life on Earth by blocking harmful radiation emanating from the sun. It also protects the surface of the Earth from impact by the myriad of objects, such as meteorites, that would otherwise strike its surface. These objects are destroyed through extreme heat caused by the friction between atmospheric gases and the surface of the descending object. It is well known in the art of space flight that any reentry vehicle must be composed of materials that can withstand or reflect extreme heat to avoid destruction.

This application discloses methods and materials for using the extreme heat generated during atmospheric reentry to cremate human remains, thereby providing a new alternative to present day internment and cremation.

SUMMARY OF THE INVENTION

The method of the present invention provides for delivering human remains to the outer atmosphere or beyond and causing or allowing them to reenter the Earth's atmosphere for the purpose of combustion, and therefore cremation, on reentry.

The method of the present invention includes providing the body of a deceased human, preparing the body for cremation in a manner similar for cremation in a crematorium, wrapping or enclosing the body in a combustible container, transporting the body to the outer edges of the Earth's atmosphere or beyond, and placing the body in a trajectory that will eventually cause it to thereafter fall toward the Earth and combust due to heat generated by friction as the body passes through the atmosphere. Reentry may be directed to occur soon after launch, or the body may be placed in an orbit that will degrade over a long period of time prior to descent and combustion. This novel method of cremation provides a means of dispersing the deceased's cremains throughout the upper atmosphere thereby enabling individuals to have their ashes "scattered" in a manner, and to a degree, never before available. In addition, the present invention allows relatives and friends of the deceased to participate in and even view the cremation process as a pleasing and dramatic farewell to their loved one.

An important object of the present invention is to launch the remains of a deceased human into the upper atmosphere of the Earth, to an elevation sufficient to cause the remains to combust and thereby cremate upon reentry and descent through the atmosphere.

Another object of the present invention is to provide an alternative to present methods of interment and cremation.

Another object of the present invention is to provide a means of delivering the remains of a deceased human into orbit about the Earth prior to eventual reentry and cremation within the atmosphere.

Another object of the present invention is to provide an alternative to the prior art practices of scattering cremated human remains upon the land or bodies of water.

Other objects and advantages of this invention will become apparent from the following description taken in connection with the accompanying drawings, wherein is set forth by way of illustration and example, a now preferred embodiment of this invention.

DETAILED DESCRIPTION OF THE PREFERRED EMBODIMENT

Figure 6:
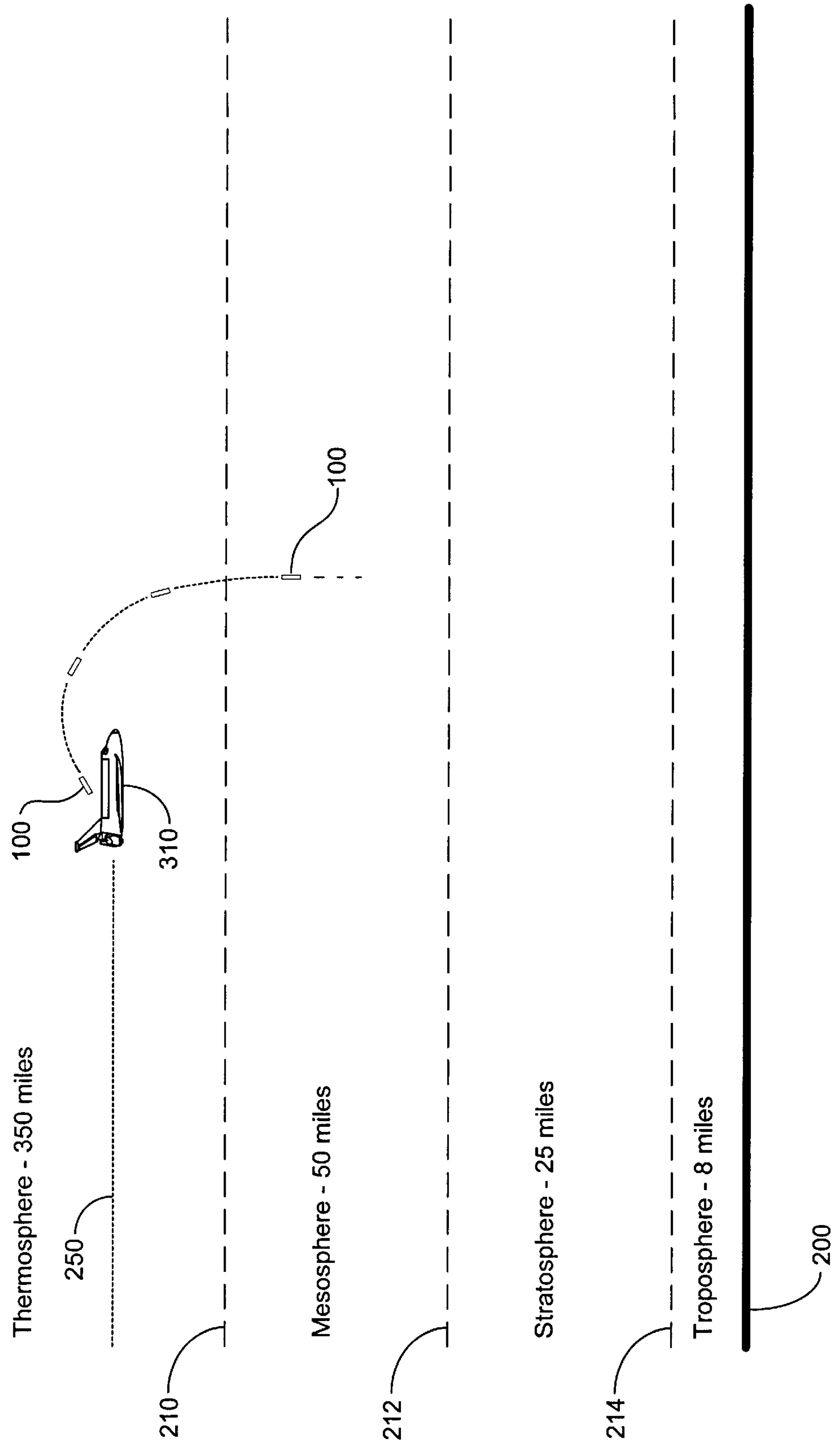
FIG. 6 is a diagram showing four atmospheric layers, the ejection of a capsule from a space shuttle orbiting the Earth within the thermosphere, and the descent and combustion of the capsule within the mesosphere.

The atmosphere of the Earth 200 may be divided into several distinct layers as indicated in FIG. 6. The troposphere 214 starts at the Earth's surface and extends 5 to 9 miles high. This part of the atmosphere is the most dense and is where most weather phenomena occur. The stratosphere 212 starts above the troposphere 214 and extends to approximately 30 miles above the planet surface. Ninety percent of the gas molecules of Earth's atmosphere exist within the troposphere 214 and stratosphere 212. The mesosphere 210 starts above the stratosphere 212 and extends to approximately 50 miles high. The thermosphere (above 210) extends from the mesosphere 210 to approximately 370 miles above the Earth's surface.

As objects such as meteorites fall through the atmosphere, they heat considerably due to friction as they collide with gas particles. Every day, millions of meteors enter the atmosphere and burn away completely rather than striking Earth. Temperatures generated during atmospheric burn often exceed 5,000° C. In addition to meteorites, man-made objects such as satellites and rocket components are routinely destroyed in this manner before striking the planet surface. These devices are made primarily of metal and can weigh hundreds or even thousands of pounds. Whether natural or man-made, most objects entering the atmosphere are eliminated within the mesosphere 210—typically the first layer to have sufficient air density to generate the required friction. By using launch vehicles known in the art, such as the NASA Space Shuttle, satellite deployment rockets, or other craft capable of achieving low earth orbit, human remains may be transported above or within the Earth's mesosphere, ejected from the transportation craft, and thereby cremated during atmospheric descent according to the method and materials of the present invention.

Figure 4:
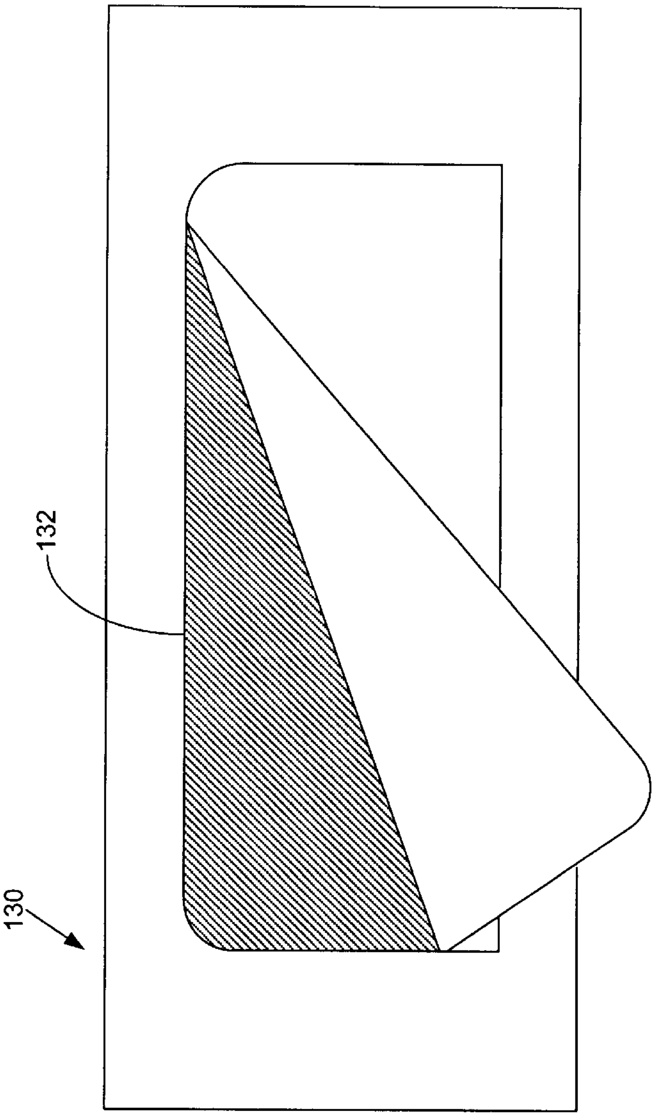
FIG. 4 is a plan view of a cadaver bag with the enclosure flap partially open.

Prior to cremation, the remains of a deceased individual must undergo preparation and storage as required by law. Preparation of the remains for reentry cremation can be performed using materials and methods known in the art of conventional cremation in a crematorium. The body is typically cleaned and disinfected, and dressed in attire according to the final wishes of the deceased or family members. To comply with relevant regulations, sufficient preservation or disinfection and refrigeration should be applied to guarantee temporary protection against decomposition. Commonly used disinfectants include solutions containing formalin, mercuric chloride, carbolic acid, or sodium hypochlorite. If refrigerated, the body should optimally be maintained at a temperature between 34 and 39° F. The body should be enclosed in a water and vapor-tight enclosure, such as a body or cadaver bag 130, to seal in liquids and odors (FIG. 4). Such enclosures are well known in the prior art as body or cadaver bags. Body bags 130 are typically comprised of polypropylene or polyvinyl with a nylon or polyester zipper or other closure 132.

Figure 1:
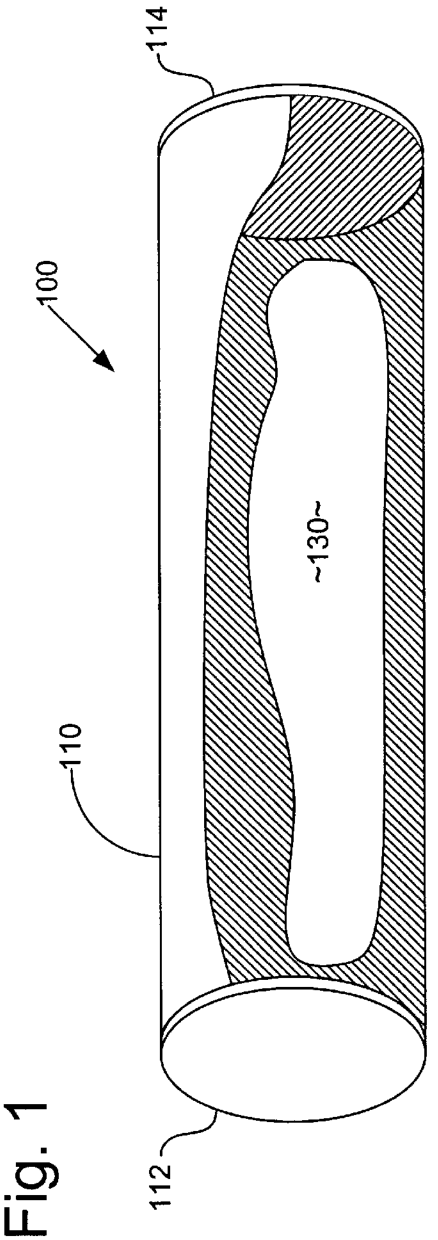
FIG. 1 is a side perspective view of a reentry capsule with the outer surface cut-away to show the interior.
Figure 3:
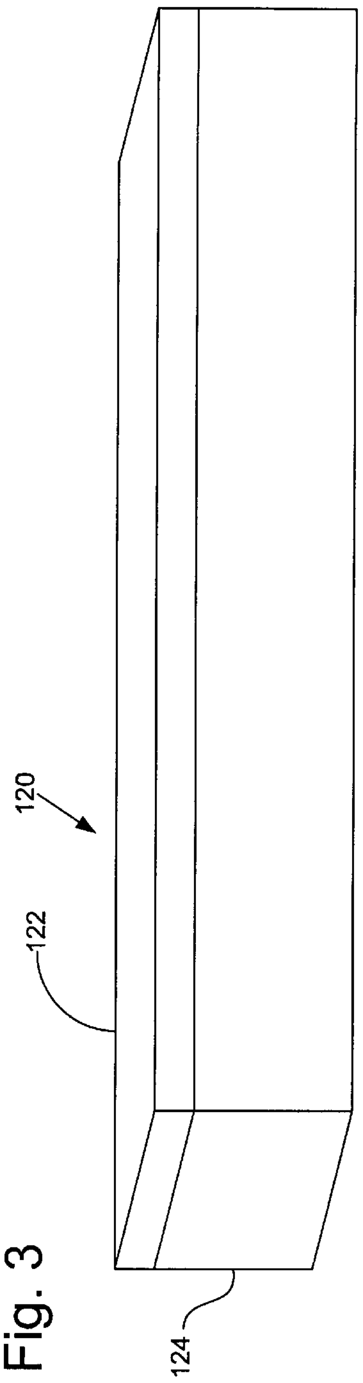
FIG. 3 is a perspective view of a cardboard container used to hold remains during cremation.

After sealing the body in the bag 130, the remains may be placed either directly in a reentry capsule 100, as shown in FIG. 1, or in an intermediate container such as a corrugated cardboard cremation carton 120, as shown in FIG. 3. These cartons are well known in the art and often come with straps for securing the body within the carton 120. Cremation cartons 120 may be sealed with a separate lid 122 placed upon a base 124 or by folding over and securing flaps (not shown). Preferably, the cremation carton 120 includes a waxed coating on all surfaces to allow the cardboard to maintain structural integrity if exposed to moisture while the carton 120 is stored or in transit. Cremation cartons are designed to completely combust at normal cremation temperatures, typically between 1,200 and 1,800° F.

Figure 2:
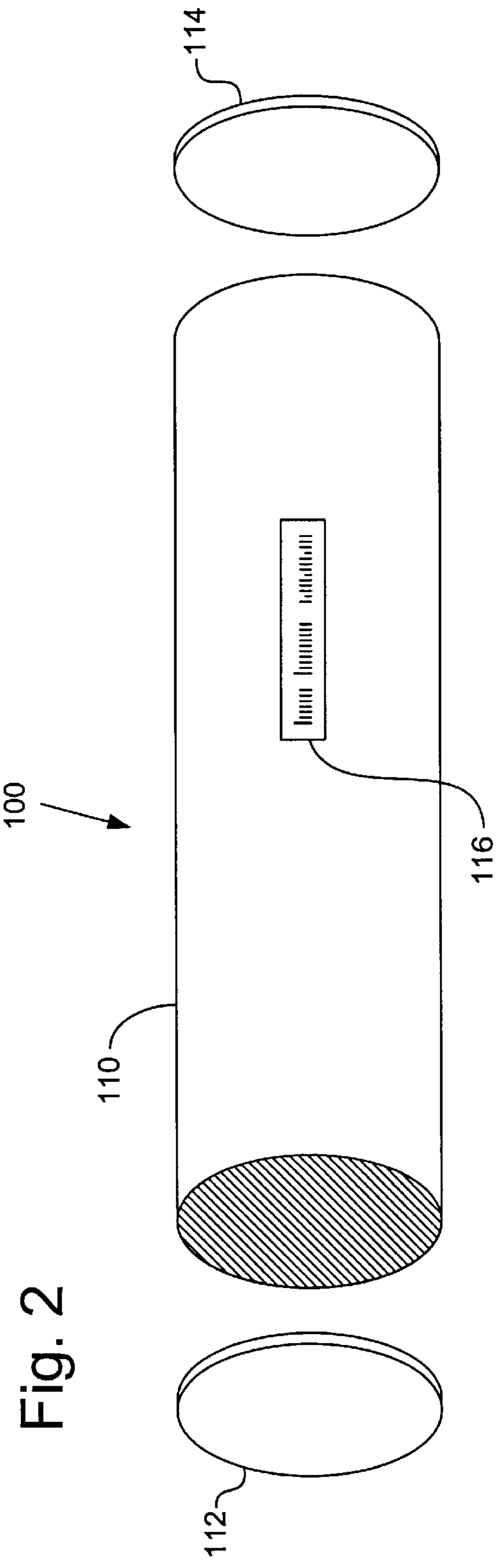
FIG. 2 is an exploded side perspective view showing the exterior of a reentry capsule.

FIGS. 1 & 2 show a reentry capsule 100 formed from an appropriately sized cardboard tube 110 sealed at either end with a solid disk 112 and 114. The body of the deceased, enclosed in a body bag 130 or other wrapping, is placed in the tube 110 and the ends 112 & 114 sealed using adhesive or other means. The reentry capsule 100 may be attractively painted as desired by the family and/or incorporate designs, messages, or signatures of loved ones on its outer surface as messages of remembrance. A label 116 providing identification of the deceased and other desired information may be attached to the capsule's outer surface.

Figure 7:
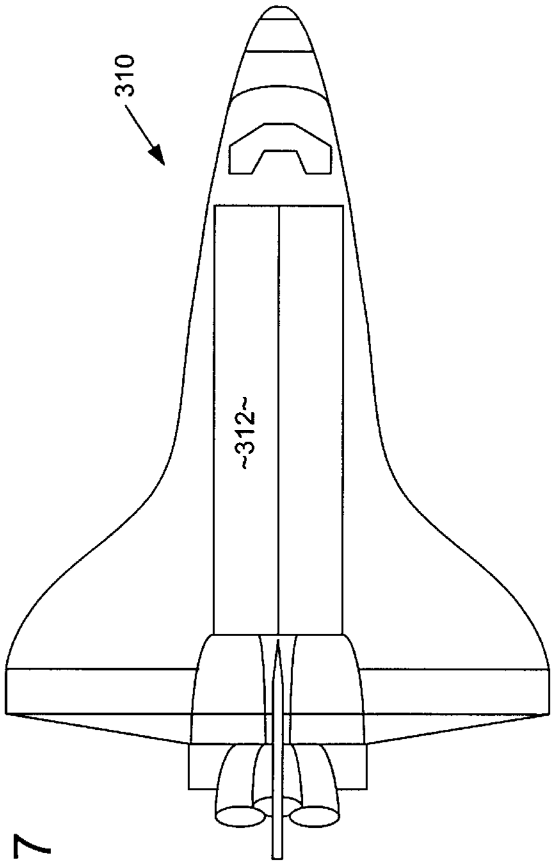
FIG. 7 is a plan view of a space shuttle showing the doors of the cargo bay.
Figure 8:
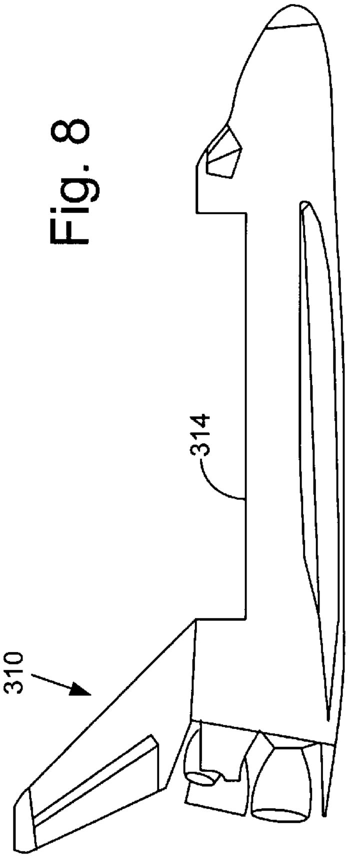
FIG. 8 is a side elevation of a space shuttle with the doors removed to show the cargo bay.

In order to facilitate the atmospheric cremation process, one or more bodies to be cremated are loaded, following the above preparation, into the cargo bay 314 or other payload containing structure 360 of a space transport vehicle. Suitable launch vehicles include rockets known in the art such as Titan, Delta, Athena, Arianne, Taurus, and Pegasus 350 multistage rockets, as well as space planes such as a NASA space shuttle 310. FIGS. 7 and 8 depict a space shuttle 310 including a cargo bay 314 and cargo bay doors 312. Payload such as satellites or the reentry capsules of the present invention are loaded and secured within the cargo bay 314 and protected during launch by the cargo bay doors 312.

Figure 11:
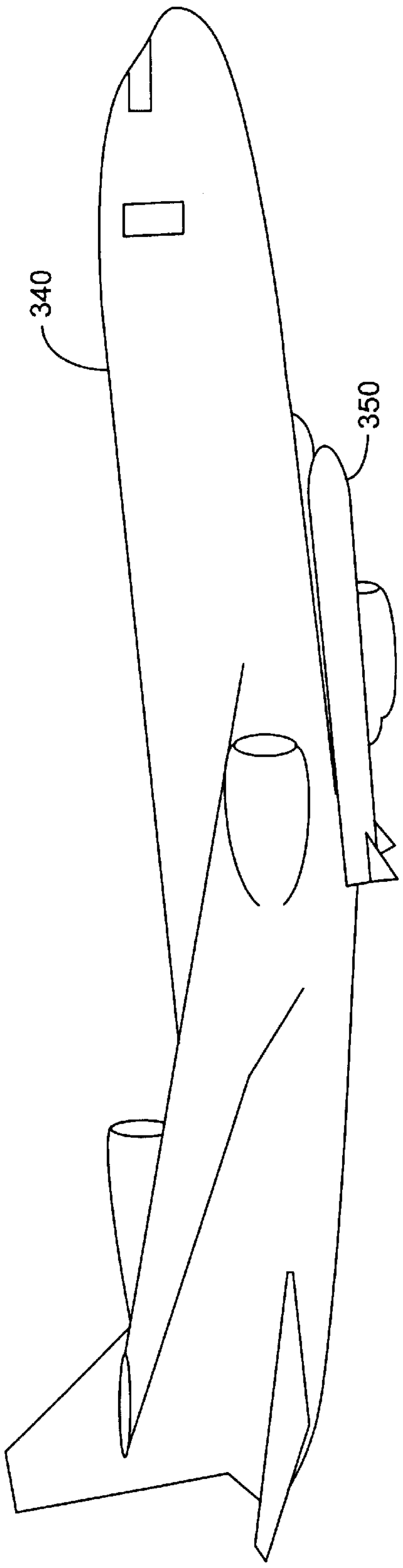
FIG. 11 is a perspective view showing a Pegasus rocket attached for mid-air launch from a L-1011 jet airplane.
Figure 12:
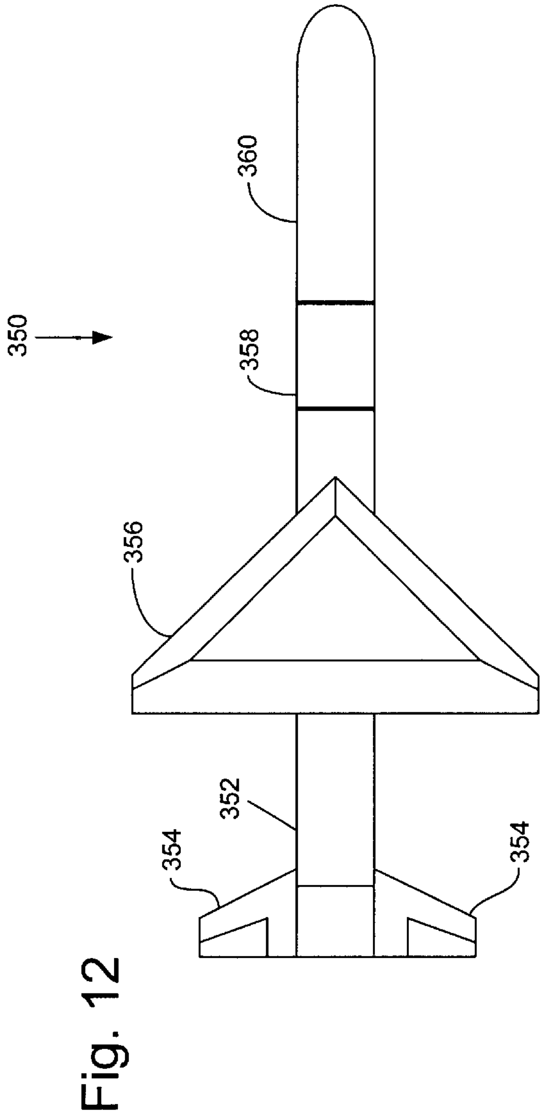
FIG. 12 is a plan view of a Pegasus rocket.
Figure 13:
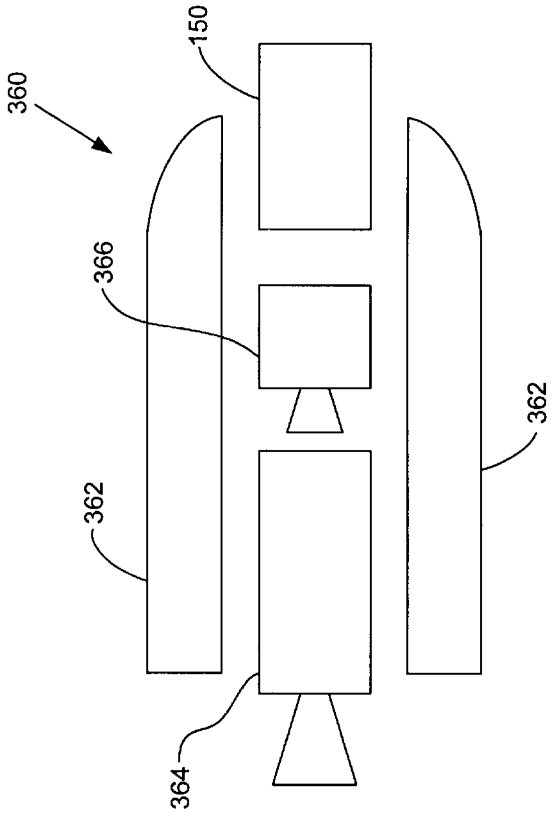
FIG. 13 is an exploded view of the third stage of a Pegasus rocket showing the second and third engines and the payload.

The Pegasus rocket is capable of delivering a 975 pound payload into low Earth orbit by mid-air launch from an airplane. Alternatively, the Pegasus rocket may be launched from the ground as part of a multistage Taurus rocket (not shown). FIG. 11 shows the Pegasus rocket 350 attached as known in the art to the underside of a L-1011 jet airplane 340. It is well known in the art to deliver satellites into low Earth orbit using a Pegasus rocket launched in mid-air and this launch means is suitable for practicing the present invention. For exemplary purposes, a Pegasus rocket 350 is diagrammed in FIGS. 12 and 13. FIG. 12 shows the fins 354, stage 1 motor 352, wing 356, interstage 358, and payload compartment 360. FIG. 13 shows an exploded view of the payload compartment 360 including the stage 2 motor 364, stage 3 motor 366, payload fairings 362, and payload 150. Because the present invention may be practiced by simply delivering the remains to a necessary elevation without selecting a particular orbit, the stage 3 motor 366 may be omitted thereby increasing payload capacity.

Figure 9:
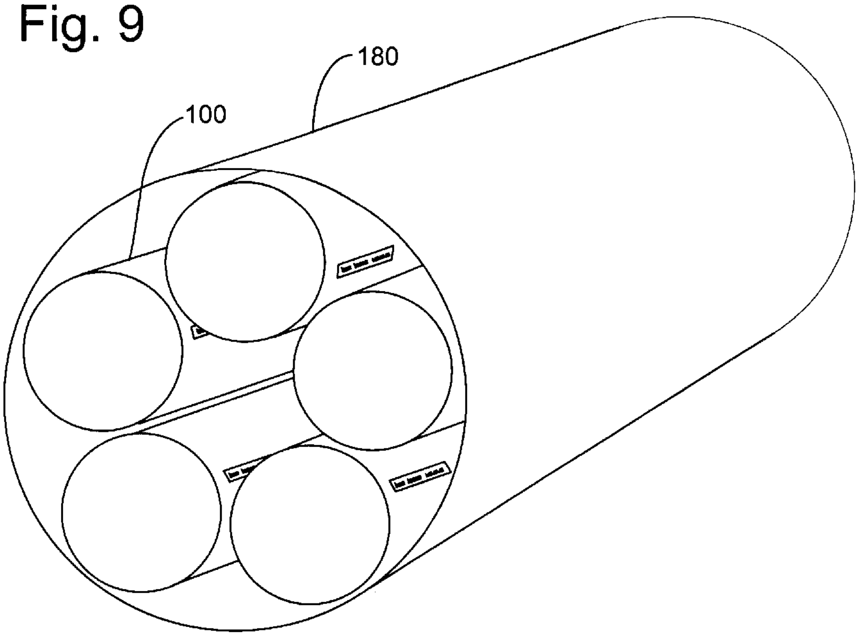
FIG. 9 is a perspective view of a cylindrical package for containing multiple reentry capsules.
Figure 10:
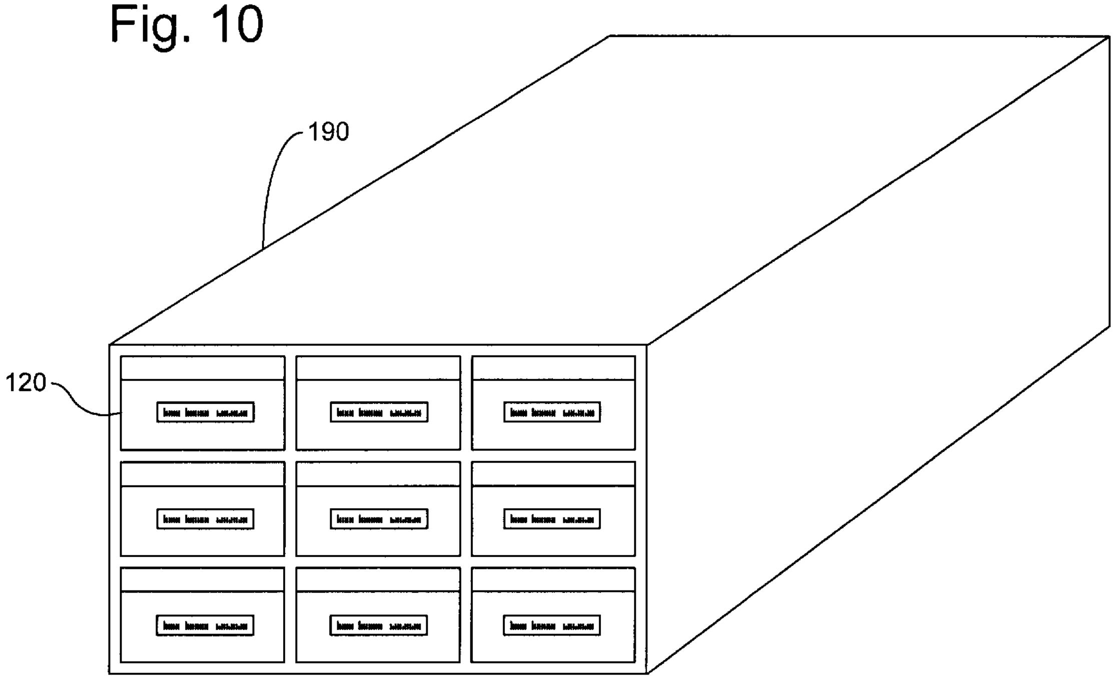
FIG. 10 is a perspective view of a rectangular package for containing reentry capsules or cremation cartons.

Reentry capsules 100 may be secured within a cargo bay using conventional means such as steel cables. Capsules 100 may be packaged in groups to facilitate loading and unloading, and may be deployed as a packaged unit for simultaneous reentry and cremation. Examples of packaging devices include an enlarged tube 180 for housing multiple cylindrical reentry capsules 100, as shown in FIG. 9, or a rectangular enclosure 190, as shown in FIG. 10, which may be used to house rectangular reentry capsules (not shown) or cremation cartons 120.

After loading, the transport vehicle is launched following normal procedures. It should be appreciated that no special provisions as required for a living passenger need to be made, such as oxygen or temperature control, other than those necessary for the vehicle crew, if any. Space shuttle missions typically include positioning the shuttle in low earth orbit with the thermosphere, at an elevation of approximately 250 miles (FIG. 6). Preceding or following deployment of other payloads, reentry capsules may be deployed either by hand, if personnel are already working within the cargo bay, or remotely through use of a shuttle grapple arm (not shown) as is often used to deploy satellites.

Figure 5:
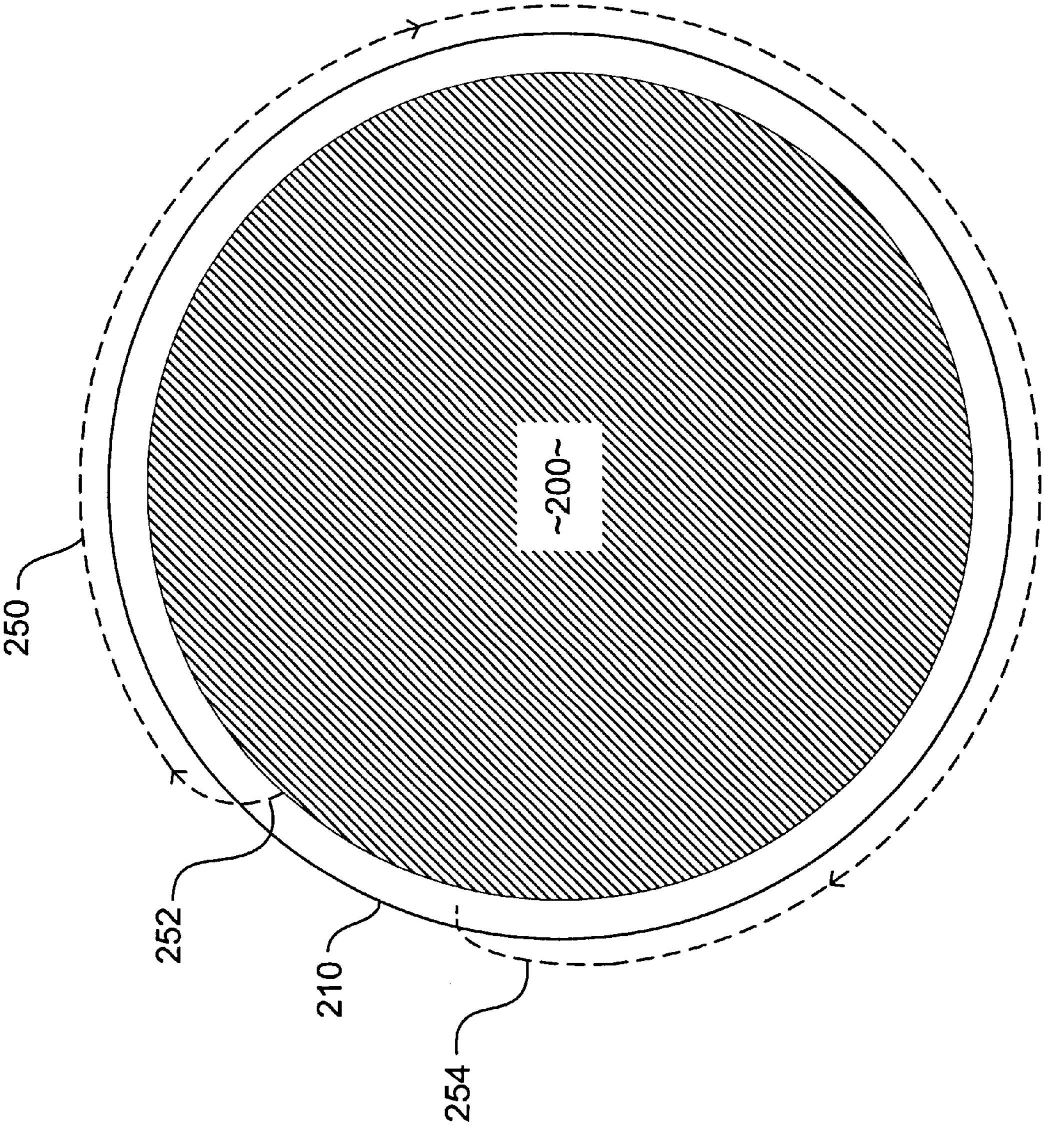
FIG. 5 is a diagrammatic view of the launch, partial orbit, and reentry of a capsule.

Because the present invention is primarily directed toward cremation of human remains upon reentry, the orbit of the capsule need not be specific. FIG. 5 shows, in simple diagram form, an exemplary path of a reentry capsule as it is launched 252 from Earth 200 to an elevation 250 above the mesosphere 210, where it may either immediately begin descent, follow a partial orbital trajectory (as shown in FIG. 5), or complete one or more full orbits, then descend 254 towards the Earth 200 for cremation during atmospheric burn. If the capsule is launched as a secondary payload, it may simply take the orbit set by the primary payload.

As an alternative to the simple containment capsule described above, a directed reentry capsule may be provided with means to direct the attitude and orbit of the capsule after deployment. This capsule may comprise attitude adjustment means well known in the art including thrusters and internal gyroscope. Thrusters may be powered by cold pressurized gas (typically helium or nitrogen) or may be fuel-driven. The capsule may also be provided with propulsion means for altering the capsule orbit. Since pressurized gas may not provide sufficient force to effect orbit changes, the preferred propulsion system would use thrusters powered by hydrazine, hydroxyl ammonium nitrate propellant, or equivalents. The capsule may be placed in any specific orbit desired, either through placement by the launch vehicle or by adjustments made after deployment as described above. A sun-synchronous polar orbit, for example, would allow the capsule to pass over the same spot on Earth every day. Data describing the orbit and placement in the sky could be provided to friends and relatives of the deceased.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method of atmospheric cremation of human remains comprising the steps of:

providing the remains of a deceased human;

preparing said remains for cremation;

providing a means for transporting said remains above the stratosphere;

loading said remains into said means for transporting;

transporting said remains to an elevation sufficient to cause said remains to combust during free fall through the atmosphere due to heat generated by atmospheric friction;

ejecting said remains from said means for transporting at said elevation.

2. The method of claim 1 wherein said preparing step includes sealing said remains within a water and vapor resistant enclosure capable of combustion or melting at a temperature in excess of 1,200° F.

3. The method of claim 1 wherein said means for transporting includes a space shuttle.

4. The method of claim 1 wherein said means for transporting includes a rocket.

5. The method of claim 1 further comprising the step of deploying said remains in a trajectory to cause said remains to orbit the Earth one or more times.

6. The method of claim 2 wherein said enclosure includes a plastic, sealable bag.

7. The method of claim 2 further comprising the step of enclosing said remains within a rigid combustible container.

8. The method of claim 5 wherein said trajectory is selected to cause said remains to pass in orbit over one or more selected points on the Earth's surface.

9. The method of claim 5 wherein said orbit is a sun-synchronous orbit.

10. The method of claim 7 wherein said combustible container includes a cardboard cylinder.

11. The method of claim 7 wherein said combustible container includes a cardboard cremation carton.

12. The method of claim 7 wherein said combustible container further includes means for identifying the deceased.

* * * * *